United States Patent [19]

Manacci

[11] 4,363,022
[45] Dec. 7, 1982

[54] SELF CANCELLING MOTORCYCLE TURN SIGNAL WHICH RECOGNIZES BALANCE

[76] Inventor: Lawrence F. Manacci, 1013 W. 30th St., Lorain, Ohio 44055

[21] Appl. No.: 249,099

[22] Filed: Mar. 30, 1981

[51] Int. Cl.³ .............................................. B60Q 1/34
[52] U.S. Cl. ...................................... 340/73; 340/56; 340/74; 340/81 R; 340/134; 200/61.45 R; 200/52 A
[58] Field of Search ................. 340/73, 56, 134, 52 R, 340/52 D, 52 H, 377, 53, 74, 81 R; 200/61.45 R, 61.52, 52 A

[56] References Cited

U.S. PATENT DOCUMENTS

| | | | |
|---|---|---|---|
| 3,555,506 | 1/1971 | Daws | 340/56 |
| 3,778,763 | 12/1973 | Johns et al. | 340/55 |
| 3,876,976 | 4/1975 | Cross, Jr. | 340/73 |
| 3,914,737 | 10/1975 | Sato | 340/55 |
| 4,030,066 | 6/1977 | White | 340/73 |
| 4,213,116 | 7/1980 | Holtzman et al. | 340/73 |

Primary Examiner—Marshall M. Curtis
Assistant Examiner—Donnie L. Crosland
Attorney, Agent, or Firm—Gustalo Nunez

[57] ABSTRACT

An improved solid state self cancelling motorcycle turn signal system that recognizes when the turn has been completed. The circuit utilizes silicon controlled rectifiers for energizing the motorcycle turn signal lights. Mercury switches are adjusted and connected in said circuit such that when the motorcycle is in an upright position, the switches will open, thus turning off the system.

2 Claims, 2 Drawing Figures

SELF CANCELLING MOTORCYCLE TURN SIGNAL WHICH RECOGNIZES BALANCE

BACKGROUND OF THE INVENTION

1. Field of the Invention

The invention is directed to an electrical circuit for use on a motorcycle for signaling to pedestrians and other motor vehicles of the drivers intent to make a turn. More particularly, the invention relates to solid state self cancelling motorcycle turn system which recognizes balance.

2. Description of the Prior Art

Various types of circuits have been designed for both motorcycles and automobiles. Many of these circuits utilize electro mechanical relays in combination with gravity sensitive switches such as mercury switches. These combinations are utilized for energizing a light for indicating either a left or right turn. Normally these lights are intermitantly energized, thus giving a visible signal. In practice, the lights are supposed to be deenergized upon the completion of the turn. The systems developed for automobiles are practical and efficient, but cannot be utilized with a motorcycle. Examples of these types of circuitry are shown in U.S. Pat. Nos. 3,555,506; 3,778,763; 3,914,737; and 4,030,066.

However, the examples cited above are not applicable to motorcycles for various reasons such as the design of the two wheel vehicle, space or the lack thereof, the area necessary in which to accomplish a turn and the inherent nature of the motorcycle. In addition to these circuits cited above, attention is directed to U.S. Pat. No. 3,876,976 to Cross, Jr. This invention is directed to circuitry which, like the applicants, is responsive to changes in gravitational and inertial forces. Cross, Jr., utilizes mercury switches in combination with electromechanical relays. When the operator wants to advise other of his intent to make a turn he does so by energizing a relay. This relay in turn will cause the indicating lamp to be energized through closed relay contacts. In principle, this would appear to work satisfactorily, however, in practice it has not. Relay contacts, because of their mechanical nature are subject to being influenced by sudden jolts or bumps and weather as experienced by a motorcycle and operator. These jolts have a tendency to momentarily open and burn the relay contacts thus cancelling the energization of the indicating lamp which defeats the intent of the operator to visibly disclose his intentions of making a turn. Situations such as this could be dangerous for the motorcycle operator and to others using the highways.

Others, such as Williamson Jr., have attempted to remedy the aforementioned problem by inserting capacitors in the circuitry to obviate the problems caused by relay contacts that jitter as a result of jolts and weather. This has been partially successful, however, after a period of time, relays and their associated mechanical contacts may freeze in an open or closed condition. This may be caused by terrific jolts which could affect the memory of the contact. It could also be caused by the metal contacts rusting or burning as a result of the elements and use.

SUMMARY OF THE INVENTION

Objectives of the invention include providing an improved solid state circuit for use with motorcycles for indicating left or right turns. Further, this improved circuit is provided with means by which it can determine balance of the motorcycle, i.e., the position of the motorcycle with respect to the horizontal. The instant invention automatically turns the indicating light off after the turn is made.

The circuit is initially turned on by the motorcycle operator by means of a hand operated switch located on the motorcycle handle bars. The initial operation of the switch causes silicon controlled rectifiers, commonly known as SCR's, to be turned on. This causes voltage to be applied to the indicating lamps. The SCR's will be permanently turned on until the circuit is opened by the operator by means of the hand switch, or when the turn is completed, and this is accomplished by mercury switches. The SCR's when being gated, cause the lights to be energized, however, the voltage as applied across the lights will be intermittent. This is accomplished by using a chip circuit, commonly known as a 555 chip. This chip causes a 1 HZ pulse to be applied to a base of a transistor (PNP), which momentarily energizes the SCR by turning it on. When on, the indicating light is lit. When the pulse is removed, the base is removed which means that light is turned off, thus reducing the voltage across the lighting element to the extent that the light is not illuminated.

The mercury switches as used in the present invention are normally closed when the motorcycle is perpendicular to the horizontal axis, i.e., when the motorcycle is being driven straight, it will be more or less perpendicular to the horizontal. Thus, if the indicating lamps are turned on, they will be kept on because the closed mercury switches insure a closed continuous circuit. The mercury switches are, of course, wired in series. When the operator commences a turn, because of the inherent nature of motorcycles, the motorcycle is no longer upright, i.e., it is no longer perpendicular to the horizontal. This causes the mercury switches to open, thus opening the circuit resulting in the deenergization of said circuit.

Of course, although not a part of the improved circuitry, comprising the invention, a standard audible alarm is also used in order to audibly indicate to the operator that the turn lights are on.

The improved circuit is also a great extent, full proof because it eliminates the mechanical devices utilized in the prior art. The reliability of solid state devices is a generally accepted scientific fact.

BRIEF DESCRIPTION OF THE DRAWINGS

Further objectives and advantages of the invention will be hereinafter referred to and/or be apparent from the following description of the preferred embodiment of the improved motorcycle turn signal system shown in the accompanying drawing and set forth in the appended claims.

DESCRIPTION OF THE PREFERRED EMBODIMENT

Figure 1:
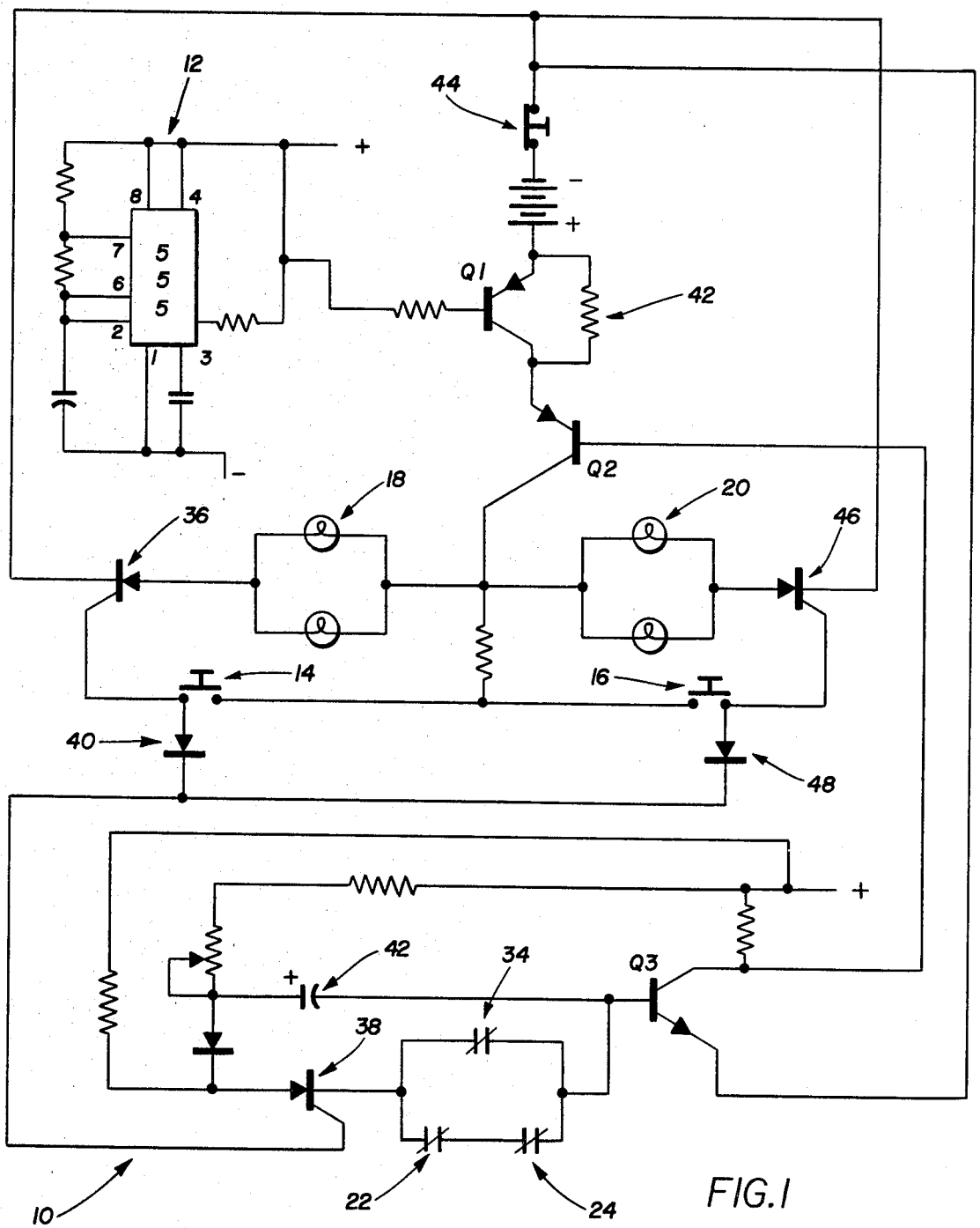
FIG. 1 is a schematic drawing of the circuit comprising the invention.

The improved motorcycle turn signal system is indicated generally at 10 and is shown in FIG. 1.

The chip circuit referred to as chip 555 is shown at 12.

The turn signals are initiated by first the closing of left turn switch 14 or right turn switch 16. Let us examine the operation of this system for a left turn operation, noting of course that the description applied equally to a right turn operation. Mounted on the motorcycle handlebars are right and left hand turn switches.

Figure 2:
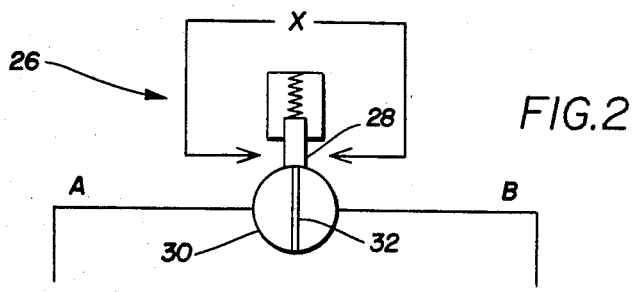
FIG. 2 is a schematic drawing of the switch utilized in conjunction with the handlebars.

Referring to FIG. 1, it can be seen that the main components of this new and improved motorcycle turn signal system are left turn switch 14, right turn switch 16, which must be of the momentary closing type. The system also includes left turn light 18 and right turn light 20, which are conventional 12 volt light bulbs. Also, very important to the operation of this system are a pair of mercury switches located on the left handlebar and on the right handlebar. The switches may be mounted conventionally to the handle bars by obvious methods. The mercury switches are affected by gravity and inertia and are designed such that the mercury switch contacts, shown as 22, left turn contacts, and 24, right turn contacts, are normally closed when the motorcycle is in an upright position. This is the position of a non-turning motorcycle. Also, integral to the successful operation of this turning system is a handlebar switch of which a part of the motorcycle frame, such as the handlebar post and the other part mounted on the moveable front finder. Again the actual mounting of this device may be done by obvious means. Referring to FIG. 2, the electrical components of the handlebar switch 26, can be seen with more clarity. Affixed to the non-moveable part of the motorcycle is an electrical brush 28. Affixed to the moveable part of the motorcycle is a circular insulator 30 having diametrically mounted therein a conducting segment 32 such that when the motorcycle is being operated in a forwardly direction, the associated contacts 34 are in a closed position.

Also shown in FIG. 1 pulsing circuit 12 which is well known to those in the art as solid state chip 555. In this particular application, the chip is used to provide a pulse for purposes to be explained later.

The motorcycle operator, in order to indicate a turning operation will activate either the left turn switch or right turn switch. Assuming for the moment that a left turn signal indication is desired, the left turn switch is activated, thus closing contacts 14. It is noted here that the following explanation is identical for a right hand turn indication. Closing left turn contact 14 results in the application of a gating pulse to SCR 36 and 38 via the diode 40. The gating of SCR 36 causes a current flow through the light 18. However, this current is limited to such an extent by the resistor 42, that it is not sufficient to turn on the lights. The gating of SCR 36 results in SCR 36 becoming a holding circuit supplying base voltage to Q2 back to the positive battery supply through resistor 42. Similarly, the gating of SCR 38 results in SCR 38 becoming a holding circuit supplying base voltage to Q3.

Note that at this point in time, there is yet a current flow through the light 18, however, no illumination because of the voltage drop through the limiting resistor 42. Now the pulsing chip 555 circuit comes into play. In this particular invention, the chip provides a 1 HZ pulse to the base of Q1. This places Q1 in a conducting situation thereby effectively short circuiting limiting resistor 42. This results in the full 12 volts being applied across the light 18 thus turning them on. The 1 HZ pulse is applied to the base of Q1 for a period of 1.5 seconds at which time it is cut off. The light 18 will be turned off because of the limited voltage caused by the voltage drop across resistor 42. Again, after a timed off period, another pulse will be applied by the chip circuit to the base of Q1 again causing left turn light 18 to turn on. This operation will continue until the operator aborts the turn indication or when the turn is commenced.

Automatic cancellation occurs when the associated handlebar mercury switch opens the contacts 22. This occurs when the turn is begun since this results in the motorcycle not being perpendicular with respect to the horizontal. Also, occurring simultaneously or nearly simultaneously, the handlebar contacts 34 will open. The point at which these contacts open depend on the width of the brush 28. When the brush breaks contact with the conducting segment 32, the contacts 34 will open. The removes SCR 38 from applying a holding potential to Q3. However, Q3 is not rendered non-conductive at this time because of the 200 microfarad capacitor 42 which discharges through the base of Q3. As long as the capacitor is discharging, Q3 will remain turned on thus keeping Q2 on and the light 18 will continue to be on. Upon the decay of capacitor 42, Q3 will turn off thus resulting in Q2 turning off. The breaks the current flow staticly through the light 18, and then the circuit is reset.

The lights, as indicated previously, can be turned off by opening the contacts 44 which could be positioned on the left and right hand turn switches, (for highway lane changes).

Similarly, for a right turn, the lighting circuit will be complete through SCR 46 and diode 48 and back through SCR 38. Hence, it can be seen that the operation of a right turn indication is identical to that of a left turn.

To those skilled in the art, an audible indicating device may be easily placed in the circuit, for example, in series with the battery. This would remind the driver that the turn signals are being activated.

What is claimed is:

1. A directional signaling system for motorcycles including;
   first and second normally open push button switches;
   a first silicon controlled rectifier connected to said first normally open push button switch;
   a second silicon controlled rectifier connected to said second normally open push button switch;
   first indicating means connected to said first silicon controlled rectifier;
   second indicating means connected to said second silicon controlled rectifier;
   said first and second indicating means connected to a first electronic switch;
   said first electronic switch connected to a second electronic switch;
   said second electronic switch connected to a power supply;
   a third silicon controlled rectifier connected to said first and second normally open push button switches;
   said third silicon controlled rectifier connected to a third electronic switch, via a plurality of normally closed contacts;
   said third electronic switch connected to said first electronic switch;
   said first normally closed push button switch, when closed, providing an electrical signal to said first and third silicon controlled rectifiers which turn on said first and third electrical switches;
   said second normally closed push button switch, when closed, providing an electrical signal to said second and third silicon rectifiers which turns on said first and third electrical switches; and a timing control means for providing a timed output signal for intermittently turning on said second electronic switch, resulting in an intermittant current flow through said first electronic switch, said second electronic switch, said indicating means connected to the closed push button switch, said silicon controlled rectifier connected to said indicating means, through said third silicon controlled rectifier and third electronic switch such that when said normally closed contacts open, said electrical energy storing device provides a sufficient electrical signal to keep said third electrical switch turned on for a predetermined period, said third electronic switch in turn keeping said first electronic switch turned on for that predetermined interval.

2. A directional signaling system according to claim 1 with a plurality of normally closed parallel contacts connecting said third silicon controlled rectifier and said third electronic switch to each other and an electrical energy storing device connected to said third electronic switch such that when said normally closed contacts open, said electrical energy storing device provides a sufficient electrical signal to keep said third electrical switch turned on for a predetermined period, said third electronic switch in turn keeping said first electronic switch turned on for that predetermined interval.

* * * * *